US006854088B2

(12) United States Patent
Massengale et al.

(10) Patent No.: US 6,854,088 B2
(45) Date of Patent: Feb. 8, 2005

(54) GRAPHICAL USER INTERFACE FOR PROJECT DATA

(75) Inventors: Randy Massengale, Bothell, WA (US); Henry L. Meuret, III, Seattle, WA (US); David M. Flotree, Seattle, WA (US); William G. Kuhn, Seattle, WA (US)

(73) Assignee: Spinoza Technology, Inc., Seattle, WA (US)

(*) Notice: Subject to any disclaimer, the term of this patent is extended or adjusted under 35 U.S.C. 154(b) by 489 days.

(21) Appl. No.: 09/826,483

(22) Filed: Apr. 4, 2001

(65) Prior Publication Data

US 2003/0137541 A1 Jul. 24, 2003

(51) Int. Cl.[7] .............................................. G09G 5/00
(52) U.S. Cl. ..................... 715/764; 715/772; 715/810; 705/7
(58) Field of Search ................................ 345/763, 764, 345/772, 810; 707/100; 705/7

(56) References Cited

U.S. PATENT DOCUMENTS

| 5,016,170 | A | * | 5/1991 | Pollalis et al. ............... 705/7 |
| 5,898,431 | A | * | 4/1999 | Webster et al. ............ 345/841 |
| 5,907,490 | A | | 5/1999 | Oliver |
| 5,973,687 | A | * | 10/1999 | Foley et al. ................ 345/866 |
| 5,974,391 | A | | 10/1999 | Hongawa |
| 6,033,316 | A | * | 3/2000 | Nixon ......................... 473/131 |
| 6,035,278 | A | * | 3/2000 | Mansour ....................... 705/9 |
| 6,036,345 | A | | 3/2000 | Jannette et al. |
| 6,092,050 | A | * | 7/2000 | Lungren et al. ............. 705/10 |
| 6,469,715 | B1 | * | 10/2002 | Carter et al. ............... 345/763 |
| 6,549,219 | B2 | * | 4/2003 | Selker ......................... 345/834 |
| 6,567,108 | B1 | * | 5/2003 | Master et al. .............. 345/853 |
| 2001/0028364 | A1 | * | 10/2001 | Fredell et al. ............. 345/751 |

* cited by examiner

Primary Examiner—Cao (Kevin) Nguyen
Assistant Examiner—Ting Zhou
(74) Attorney, Agent, or Firm—Black Lowe & Graham PLLC (57) ABSTRACT

A project management display method and system in which a user logs on to a server from a client computer over a network to display a graphical interface associated with a project. The graphical interface allows the user to view, edit and navigate project data. The graphical interface includes a graphical object that looks similar to a radar screen. The radar screen further includes one or more design objects that provide to the user indicators to those objects that are most important. The indicators change color or position to indicate to the user the urgency associated with a project or task. The graphical interface provides the user the ability to edit project data and have those edits reflected through the graphical interface. The graphical interface also provides the user the ability to navigate through the displayed project and the radar screen view is update accordingly.

30 Claims, 6 Drawing Sheets

GRAPHICAL USER INTERFACE FOR PROJECT DATA

FIELD OF INVENTION

This invention relates to an improved graphical user interface for displaying project status information.

BACKGROUND OF THE INVENTION

Project management systems abound in many forms today. The most common project management systems and software are complicated and difficult to learn. Users must be familiar not only with general computer functionality but also the specific type of idiom related to project management. For example, to schedule and monitor tasks, a necessary skill associated with project management, a user must rely on the use of complicated charts to manage the duration and resources associated with the tasks of a project.

Additionally, a common problem with many project management systems is that the visual representation of the project's underlying data tends to be comprehensive and complex. In many project management systems, simple additions or changes to a project or task require extensive and time-consuming navigation and editing of data across a multitude of display screens. Additionally, a visual inspection of the project or task data requires the same navigation of multiple display screens. Moreover, present project management systems tend to treat all deadlines and milestones alike, without drawing any visual attention to those that are more important or pending immediate attention.

For example, U.S. Pat. No. 5,974,391 discloses a method for creating and displaying a type of bar chart called a Gantt chart. To use the method, a user is required to be skilled in understanding how Gantt charts display time sequencing through the use of timeline bars visually displayed within the chart. Additionally, because the data of the project is displayed in charts with multiple timeline bars, there is no intuitive view of the overall data from a single view.

In another example, U.S. Pat. No. 6,029,050 discloses a project management system that incorporates the use of a data-wedged pyramid graphical interface for navigating through the data associated with the project. However, the graphical interface is static and does not present any of the underlying data in combination with the interface. The interface merely serves as a front-end to get to the underlying data.

In yet another example, U.S. Pat. No. 6,036,345 teaches a project management system that identifies and displays a variety of project design objectives, the groups of persons responsible for those objectives, and the progress made toward the objectives. However, the data associated with the project is contained in a plurality of display windows and is not easily navigable or ascertained. While the interface provides the status of an objective, a user must know how that status relates to other objectives. The interface does not convey graphically an impression that any objectives may be more urgent than others.

Finally, the present project management systems do not provide a quick, intuitive way for a user to manage, join, assign, or otherwise provide project management functions across an enterprise-wide network environment without having to add additional hardware or software at the server or client level. Additionally, the systems rely on slow scripting from the server side to display poorly displayed Web pages that graphically do not enhance the viewing, editing or navigation of the data presented.

Accordingly, there is a need for an easy-to-use project management system with an intuitive graphical interface that overcomes the many drawbacks of the prior existing methods and systems.

SUMMARY OF THE INVENTION

The present invention provides a graphical user interface for displaying project status and task information. The interface represents events in a manner that draws attention to those that are most important.

In accordance with another aspect of the invention, the project management interface includes a screen display for viewing, editing and navigating project data.

In accordance with another aspect of the invention, the screen display includes an area employing a design object similar to a "radar screen." The radar screen further includes graphical elements. The elements displayed on the radar screen are visual indicators of the current status of the project or tasks and are also used as an interface to the underlying project data.

In another aspect of the invention, the radar screen includes an outer and inner ring. The outer ring of the radar screen displays the name of the project and task presently displayed. The outer ring also contains a graphical progress bar object that represents the progress of a project or task. The radar screen may also include one or more concentric circles emanating from the center. The circles represent a continuum of attentiveness. An urgency of attentiveness is indicated by the display of certain of the visual indicators on the radar screen. Other visual indicators display other attributes or information of the project and are used to navigate the project.

In yet another aspect of the invention, the visual indicators include graphical colored icons representative of the tasks of the displayed project, such that the color and position of the icons are visually indicative of the status of the project or tasks.

In accordance with still another aspect of the invention, the radar screen is further divided into one or more wedges with each wedge representative of a separate task and various attributes of the task. The size of each wedge represents the relative importance of the task to the project as a whole. Thus, for example, four tasks each of equal importance would divide the radar screen into four equal quarter-circle wedges.

In accordance with still another aspect of the invention, the background of the radar screen or one or more of its wedges is color-enhanced to provide visual indication to the status of project or tasks.

In accordance with yet another aspect of the invention, the user views the radar screen and other viewable objects of the interface to ascertain the current status of the project and tasks. The user interacts with the radar screen by clicking on various visual indicators associated with individual projects or tasks. For example, the user can click on a certain colored alarm clock icon to display attributes of the task associated with that alarm clock.

In accordance with another embodiment of the present invention, the visual indicators can include any number of different graphical elements including for example, other graphical icons, static and animated images, other colors, and any other element that can draw attention to the status of projects or tasks, including for example, sounds.

In accordance with another aspect of the invention, the project management interface is divided into two halves. On one half of the display, project data is presented and edited by filling or checking various types of dialog boxes or panels associated with various project management tasks. The other half of the display includes a folder navigation area that allows a user to browse various hierarchical views of the project by navigating a file tree. The file tree graphically represents the project hierarchy with icons representing projects and tasks.

In accordance with yet another aspect of the invention, the system includes a server and a remote client that are connected over a network, which preferably is the Internet. The server includes memory to store program instructions and a computerized database associated with the project. The associated computerized database contains information related to the project management data, for example, authorized project users, project names and dates of tasks. The server of the preferred embodiment is preferably an Internet server or any device capable of sending Web pages of information to the client. The client is a personal computer or any other electronic device capable of connecting to the server. By accessing the system, users can create and manage project data from home, the office, or any other location at which the remote computer may be located.

In accordance with yet another aspect of the invention, the user accesses the project management interface by providing an authentication code to the server, which server then sends the updated interface with the appropriate project data, if any, to the user for display on the client device.

In accordance with another embodiment of the present invention, the project management interface is initially displayed without specific data so that the user can create a new project, assigning project and tasks attributes as necessary.

In accordance with further aspects of the invention, many other options are available to manage the project through the project management interface including for example, assigning tasks to other users, assigning the values and priorities to each project and task, sending email, and adding new project users or contacts.

In accordance with yet another aspect of the invention, any change to any of the session project data is updated to the server and the graphical interface reflects the changes as necessary.

BRIEF DESCRIPTION OF THE DRAWINGS

The preferred embodiment of this invention is discussed in detail below with reference to the following drawings.

DETAILED DESCRIPTION OF THE PREFERRED EMBODIMENT

Figure 1:
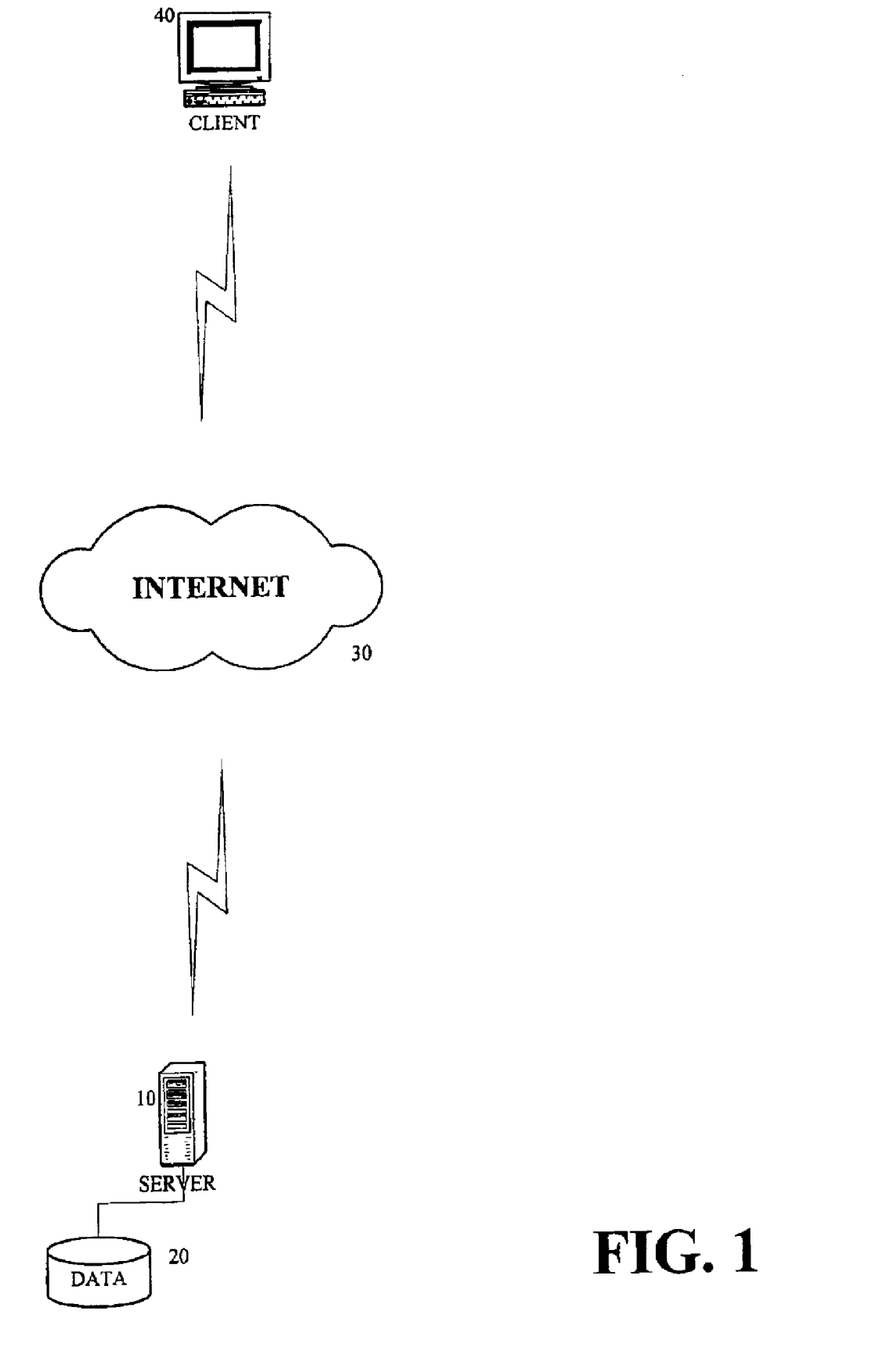
FIG. 1 is a block diagram illustrating an embodiment of the systems for the project management interface invention.

FIG. 1 is a block diagram depicting a preferred embodiment of the project management interface invention. Referring to FIG. 1, a server 10 with attached data memory 20 is connected via a network 30 to a client 40 that includes a display.

The server 10 is configured to send the project management interface via Java-enhanced HyperText Markup Language ("HTML") Web pages to other computers over the network 30, including to the client 40. The Web page is sent to the client 30 so that it may be viewed under the client's 40 browser software. While HTML is the preferred format for transmitting information from the server to the client, it is certainly not the only format possible. Rather, the client and server may communicate using any of a variety of other languages and data formats. While the server 10 is preferably an Internet or "Web" server, it may alternatively be any type of hardware device or software code capable of being accessed over a network (including internet, intranet, LAN, cable lines, telephone lines, or any other wired or wireless network) by a remote client computer. The server 10 stores program instructions, program logic and project management data in one or more attached data memory devices 20. Alternatively, the server 10 stores all project management data in memory within the server or the memory of a device separate than the memory of the server.

The client computer 40 is a remote computer that is coupled to the server 10 over the Internet. In general, the client 40 will be a home or office personal computer capable of accessing the server 10 over the Internet. Nonetheless, the client 40 alternatively is any electronic device capable of accessing the server 10 over the network 30 including, for example, a television set-top box, "palm-top" device, cell phone, pager, or other device.

The client computer 40 includes a display that is coupled to the client 40 and displays the Web page or other information or data downloaded from the server 10. The display is a computer monitor of the type typically connected to a home or office computer. Alternatively, the display may include a television, LCD panel, or any other device capable of visually conveying electronic information.

Figure 2:
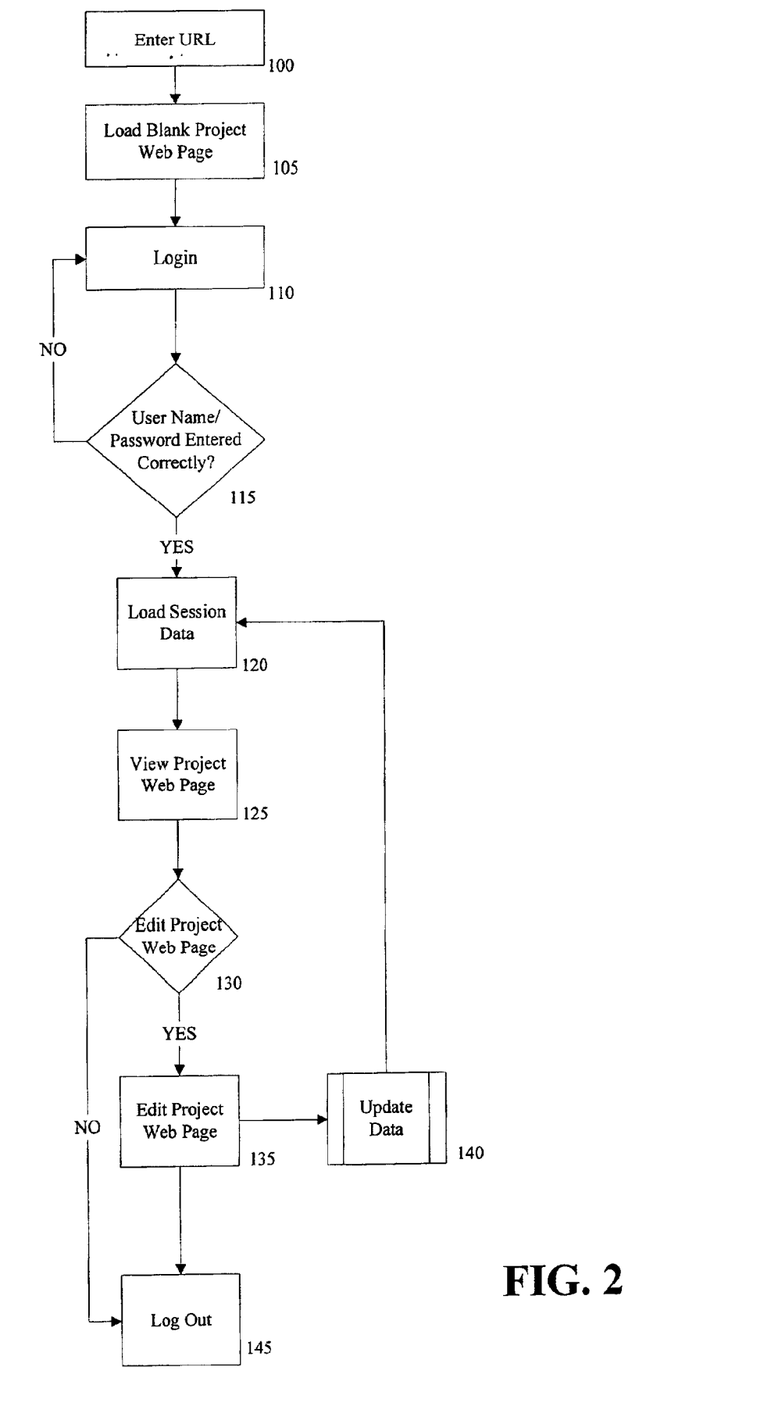
FIG. 2 is a flow chart illustrating the viewing or editing of the project management interface.

Referring to the flow chart of FIG. 2, a user accesses the main or "home" page on the server 10 at block 100 by entering an appropriate Universal Resource Locator ("URL"), IP address, or other means of identification into an Internet browser or other available software allowing Internet communication and associated with the client 40.

At block 105 in response to a user entering the URL on a client 30, the server 10 sends from a database 20 associated with the server 10, over the network 30, the Java Applet enhanced blank project Web page associated with the URL location. While a Java Applet enabled Web page is the preferred format for transmitting information from the server to the client, it is certainly not the only format possible. Rather, the client and server may communicate using any of a variety of other languages and data formats.

The user is presented with a login dialog box at block 110. The dialog box is a geometric editing window that appears temporarily on top of the Web page to allow a user to edit a variety of contextual information, specific to the database20 associated with the memory of the server memory 10 and associated with the project. At block 110, the user enters via an input device such as a keyboard, the user's name and password into the dialog box.

The server 10 authenticates the user at block 115 by comparing the user-entered data at block 110 and the database20 associated with the memory of the server memory 10. If the user enters an authenticated user name and password, the blank Web page 105 is updated by the server 10 to reflect the session data at block 120. The session data loaded into the blank Web page is the data associated with the user's name and password and stored in a database 20 associated with the memory of the server 10. Below, FIGS. 3, 5, 6A, and 6B illustrate exemplary embodiments of the Web page loaded with session data. Alternatively, a user who is logging on for the first time or has not been assigned to a project may only have access to the blank project Web page of block 105.

At block 125, the updated project Web page is viewable through the local browser software on the client 40.

At block 130, the user chooses either to edit the various project tasks on the project Web page or, if finished viewing the project status, to log out at block 145. The project Web page is edited by the user entering via input means, for example a keyboard, new data or changing project data that was loaded at block 120.

Upon editing the project data at block 135, the new or changed data is updated 140 to the database20 associated with the memory of the server 10, which then at block 120 displays from the server 10 over the network 30 the updated project data in a Web page rendered on the client 40. The Web page displays the new session data based on the data the user entered at block 135. Upon completion of the edits, the user logs out at block 145.

Alternatively, the user at block 130 does not choose to edit the project but simply views the data displayed on the Web page at block 125. Upon completion of the viewing, the user logs out at block 145.

Figure 3:
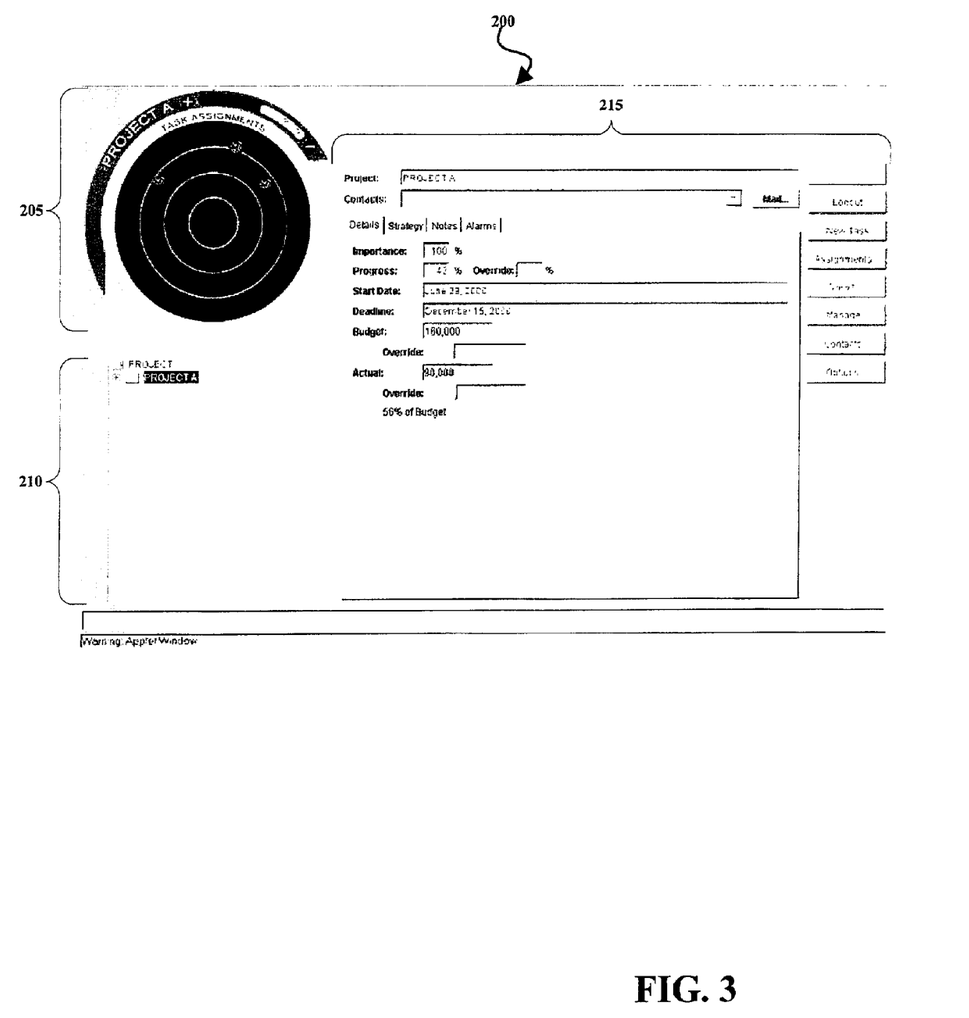
FIG. 3 is an illustrative embodiment of a display of the project management interface according to the present invention.

Referring to FIG. 3, an illustrative embodiment of the display of the project management interface is shown. The viewable project Web page 200 is divided into three distinct display areas: (1) a radar screen 205; (2) a folder navigation area 210; and, (3) a detail panel editing area 215. The areas of the Web page are further discussed below.

Figure 4:
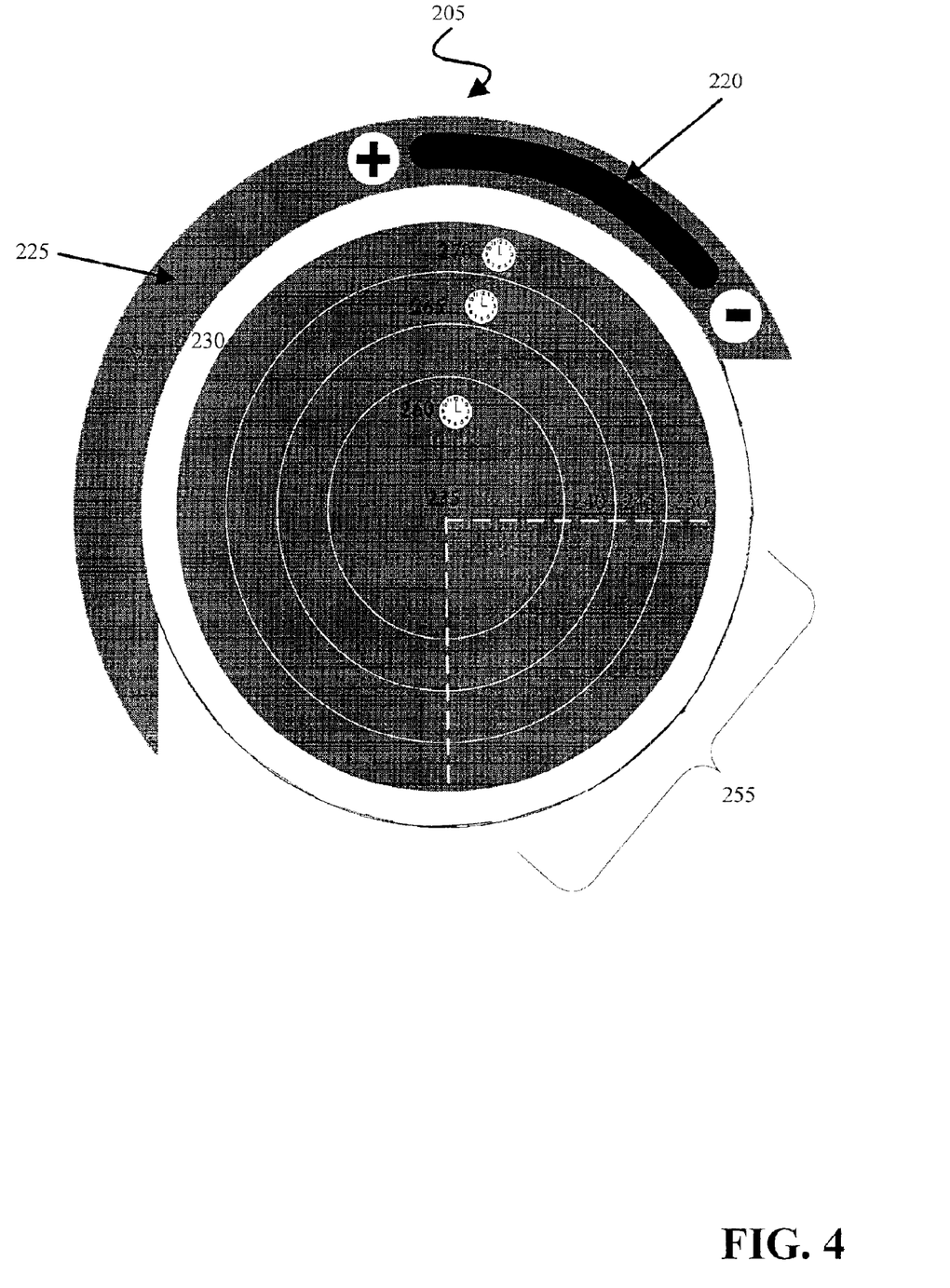
FIG. 4 is an illustrative embodiment of a display of the project management radar screen of the project management interface.

On the display of the client 40, the user views the project Web page 200 and a plurality of graphical elements of the radar screen 205. The graphical elements are visual indicators to call attention to the urgency of a project or task based on logic stored in the server memory 20. The graphical elements are stored in a database 20 associated with the memory of the server 10. FIG. 4 further depicts the graphical elements of the radar screen.

The folder navigation area 210 allows the user, via a mouse, keyboard or other input device, to navigate on the client display, the viewable hierarchy of folder and task icons related to the project and tasks and stored in a database 20 associated with the memory of the server 10, and is further explained below with reference to FIG. 5.

The detail panel editing area 215 allows the user to view and edit, via a mouse, keyboard or other input device, various detailed aspects associated with controlling the viewable project and tasks and is further explained below with reference to FIG. 5.

Referring to the illustrative diagram of the radar screen of FIG. 4, the user tracks the current status of the project or tasks by viewing the graphical elements on the radar screen 205. The radar screen 205 consists of several elements. An outer band 225 comprises the outermost partial arc and includes a label area 227 containing the name of the folder associated with the displayed project or task. Although shown as a partial arc, the outer band 225 could be a full arc, circle or other shape. A progress bar 220 occupies a portion of the perimeter of the radar screen preferably adjacent to the label area 227. Plus ("+") and minus ("−") icons are located on the left and right, respectively of the progress bar 220. As discussed above with reference to FIG. 3, the progress bar fills with a color to indicate the progress toward completion of the currently displayed project or task, where 0% is in the direction of the "−" icon and 100% is in the direction of the "+" icon. Although the icons of the progress bar 220 are shown as plus ("+") and minus ("−") icons, the icons could be arrows, numbers or any other graphical element indicating the progress of a project or task. The radar interior consists of a plurality of concentric circles 235 through 250. The circles represent a continuum of deviations from intentions. There is no limit to the number of concentric circles the radar screen 205 may deploy.

The outermost full circle 230 contains the name of the folder or task one hierarchical level down from that indicated in the label area 227 of the outer arc 225. Thus, for example, the name "Task Assignments" could denote a task folder one level below the project it is assigned to. Likewise, the name "Task1" could denote the name of the first task assigned under the folder named "Task Assignments."

A radar wedge 255 represents a displayed task and the relative importance of the task compared to other tasks in the same folder. Thus, for example, a wedge related to a task that is allotted a twenty-five percent importance level for that single task is displayed as a wedge accumulating one-quarter of the whole of the concentric circles. A single wedge can represent a single task that is 100% of the importance of the folder.

Any number of alarm icons can be displayed within the concentric circles 260–270. The alarm icons illustrate a descendant project or task that has one or more active alarms. The active alarm icons provide visual notification to the user that the project or task needs attention. The alarms are set active by the execution of logic in program instructions stored in the server memory 20 comparing relevant data entered by the user in the detail panel editing area 215 referred to below in FIG. 5. The active alarm icons display when certain project criteria are triggered, for example, when the actual expenditures exceed budgeted expenditures, when a selected project has passed its deadline without completion, or when a selected project's expected progress is greater than the actual progress. A radar wedge that has an active alarm can be represented both by the alarm icon (or any other similar icon demonstrating a time element), and by the wedge 255.

The alarm icons 260 through 270 and the radar wedge 255 are color enhanced to visually indicate the overall "urgency" of the underlying data the icon or wedge represents. For alarm icons, the urgency level correlates high to red, medium to orange and low to green. For radar wedges, the urgency level correlates high to magenta, medium to orange-brown, and low to blue. In the event that the user edits data in the detail panel editing area 215 referred to in FIG. 5, and the new data creates urgency, the color of the alarm icons and the radar wedge will change to properly correlate with the new urgency levels of the changed data. Any data changed in the detail panel editing area 215 is automatically synchronized over the network 30 by the server 10 to the display of the client 40 of the project Web page to reflect the changed data and any changed visual indicators.

Figure 5:
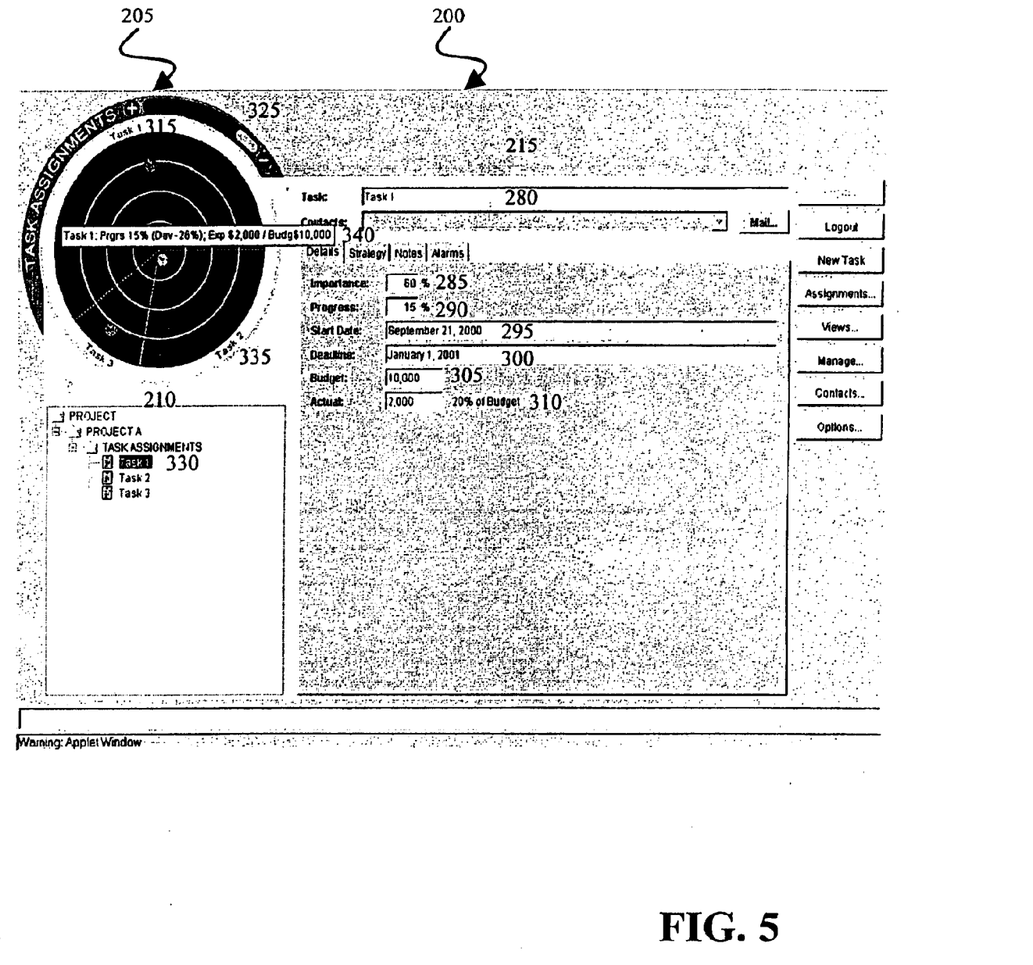
FIG. 5 is an exemplary illustrative embodiment of the display of the project management interface radar screen according to the present invention.

Referring to the illustrative diagram of FIG. 5, the user enters data into the detail panel editing area 215 via an input means. The entry of data by the user causes the server to execute program instructions from the server memory 20 to synchronize the newly entered project data on the project Web page 200 and to store the data in a database 20 associated with the memory of the server 10. The newly synchronized data is displayed on the client 40 display as referred to in FIG. 2 block 120.

At 280 the user enters the name of the task. The name entered is reflected as a task node in the folder navigation area 210 and viewable as an icon 330. The node is the next level in the project hierarchy below the folder level. Additionally, the task name is reflected in the outer most circle on the radar screen at 315.

At 285 the user enters the percentage of importance of the currently displayed task. The percentage entered is reflected by the size of the radar wedge displayed 335 relevant to the combined value of the importance of all other tasks associated with the project.

At 290 the user enters the percentage of completion of the displayed task The progress bar 325 fills relative to the percentage of the task completed with a completely filled bar indicative of the task being 100% complete.

At 295 and 300 the user enters the start and deadline date respectively by which the displayed task should be started and completed. The start date and the deadline date are used by the program instructions stored in the server memory 20 to execute logic to determine the color of the task's associated alarm clock icon and the position of the icon on the radar screen. As discussed above, the color of the icon is a visual indicator to the attention level for that task. The alarm clock icon's position on the radar screen moves closer to the center of the radar screen to visually indicate to the user more attention is needed. The alarm clock icon is no longer displayed when the progress percentage is at 100 percent.

At 305 the user sets the budget for the task. Relative to the actual amount spent 310 the alarm clock icon and the radar wedge change viewable physical attributes to reflect the urgency of the actual amount spent 310 over the budget 305. The budget amount 305 and the actual amount spent 310 are used by the program instructions stored in the server memory 20 to execute logic to determine the type of icon displayed, the color of the task's associated icon and the position of the icon on the radar screen.

Alternatively, the alarm icon becomes a dollar sign icon when the amount actually spent on a task 310 exceeds the budgeted amount 305 and like the alarm icon described above, changes colors to reflect the attention level associated with that icon. Similar to the alarm icon, the dollar sign icon's position on the radar screen moves closer to the center of the radar screen to visually indicate to the user more attention is needed.

An input device such as a mouse is used to rollover elements of the radar screen including any wedge of a slice of the radar screen or an alarm or dollar icon displayed on the radar screen 205. The rollover of the input device over an element of the radar screen 205 causes program instructions in the memory of the client 40 to execute code to display a pop-up box 340. The pop-up box 340 indicates a concise summary of the data related to that element. The data displayed is the data previously entered in the detail panel editing area 215 by the user and referred to above. For example, a rollover of the alarm icon associated with "Task 1" 315 indicates via the display of a pop-up text box 340 the current specific details associated with that task and stored in stored in a database 20 associated with the memory of the server 10.

Figure 6A:
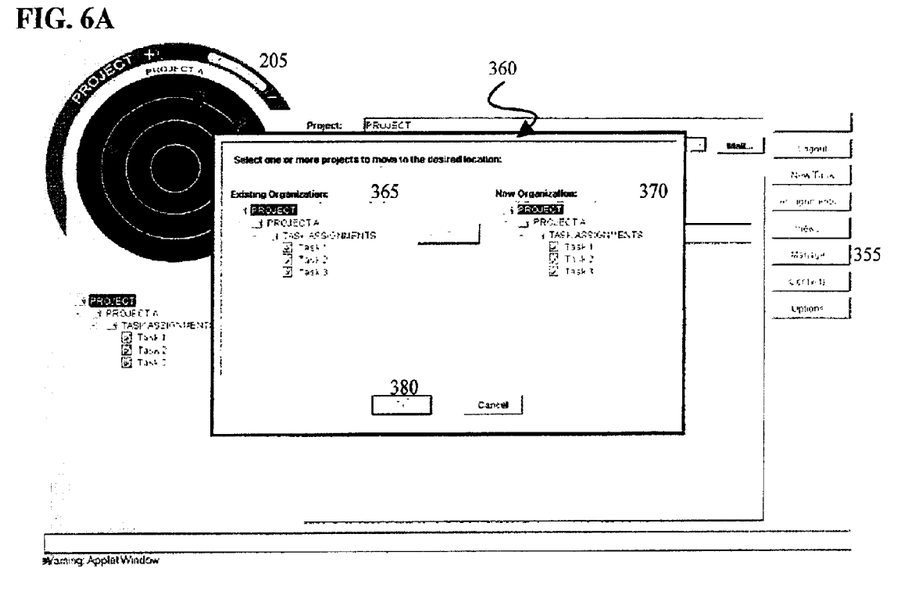
FIG. 6A is an exemplary illustrative embodiment of the display of the project management interface radar screen according to the present invention.

Referring to FIG. 6A, a user via an input device such as a mouse clicks on a "Manage" button 355 whereby the server 10 sends to the display of the client 40 over the network 30 a "manage" dialog box 360 associated with managing tasks and projects. The user chooses to move any viewable icon associated with any "Existing Organization" 365 into a "New Organization" 370 by clicking on the chosen selection and then clicking the "OK" button 380. The user can choose to move any project or task from any level of the folder hierarchy of the "Existing Organization" to any level of hierarchy of the "New Organization" The changes are reflected on the radar screen 205 and synchronized and stored in a database 20 associated with the memory of the server 10. For example, moving a task icon from the "Existing Organization" to the "New Organization" folder hierarchy also moves any data associated with the task to the appropriate database in the memory 10. Thus, the currently viewable radar screen 205 would no longer display the alarm icon that was associated with that task.

Figure 6B:
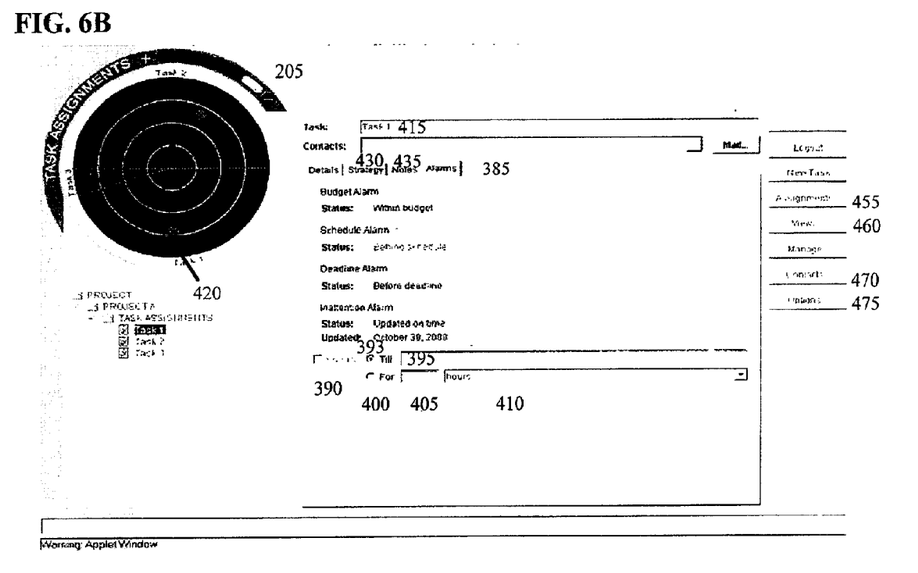
FIG. 6B is an exemplary illustrative embodiment of the display of the project management interface radar screen according to the present invention.

Referring to FIG. 6B, a user via an input device like a mouse clicks on the "Alarms" panel 385 of the detail panel editing area 215 referred to in FIG. 3, whereby the server 10 displays to the client 40 over the network 30 the Alarms panel display 385. The user chooses to snooze all alarms by clicking the "snooze" box 390 and clicking the "till" button hole 393 and filling in the date and year 395. Alternatively, the user chooses to snooze all alarms by clicking the "snooze" box 390, clicking the "for" button hole 400, filling in a number at 405 to denote the number of hours, days or weeks 410 the alarms should be snoozed "till." Snooze, as meant here, means to suppress the alarm icons from being displayed for a certain allocated period. The changes are reflected on the radar screen 205 and to all the alarms clock icons 420 associated with the project and stored in the database 20 associated with the memory of the server 10.

Referring to FIG. 6B, a user via an input device clicks on a "Strategy" panel tab 430 for adding or entering free-form text in a text entry area. The text entered by the user is stored in a database 20 associated with the memory of the server 10 and is viewable each time the user or any other user with access to project database 20 clicks on the strategy panel tab 430.

Referring to FIG. 6B, a user via an input device clicks on a "Notes" panel tab 435 for adding or entering free-form text in a text entry area. The text entered by the user is saved to the database associated with the server 20 and is viewable each time by the user or any other user with access to project database 20 clicks on the notes panel tab 435.

Referring to FIG. 6B, a user via an input device clicks on a "Contacts" button 470 for managing via a contacts panel dialog box the names and other information of users able to access the data of the project management display system. After clicking on the Contacts button 470, the user manages the names by entering the data into various text entry areas displayed to the user from the server 10. The data can be any kind of information attributable to a user of the project management display system, including for example, the names of users allowed to view and edit one or more projects. The data entered by the user is saved to the database 20 associated with the server 10 and is viewable each time the user or any other user clicks on the "contacts" button. In some instances, a user may choose to add some user names to only one or more projects but not all available projects from the database of projects stored in a database 20 of projects associated with the memory of the server 10 thus limiting access to the data of the of the project management display system. Alternatively, a non-user of the project management display system may be added to the contacts.

Referring to FIG. 6B a user via an input device clicks on the "Options" button 475 for entering in the options panel dialog box various user information, including for the user's name and email address. Through the interface of the system, the user can create and send email to other users of the project management system. Additionally, the options panel allows a user to set an inattention alarm interval that sets an alarm based on the user input of the maximum amount of time a project or task can progress without any activity. The time entered by the user is stored in the database 20 associated with the memory of the server 10 and is used by the program instructions of the server 10 to signal to the user via one or more visual indicators as discussed above that the project has not being given adequate attention.

Referring to FIG. 6B a user via an input device clicks on the "Assignment" button 455 for assigning users to projects or tasks. The name of available users is stored in a database 20 associated with the memory of the server 10. Any assignments allow the assigned user to edit the project or task assigned to them.

Referring to FIG. 6B a user via an input device clicks on the "Views" button 460 for assigning viewing privileges to other users. The name of available users is stored in a database 20 associated with the memory of the server 10. Any assignments allow the assigned user to view the project or task assigned to them.

While the preferred embodiment refers to the use of certain graphical elements to demonstrate visual aspects for the display of projects and tasks, those skilled in the art will recognize that the elements are interchangeable with many other elements that incorporate a means to indicate the status of a project or task.

The embodiments of the invention in which an exclusive property or privilege is claimed are defined as follows:

1. A graphical user interface for displaying project status information, comprising:
   a graphical display workspace having a generally central point; and
   one or more graphical elements contained within the workspace and arrayed around the central point, wherein each graphical element represents a project attribute, and a position of the one or more elements within the workspace relative to the central point is indicative of a relative hierarchy of the project attribute within a series of project attributes in the project, wherein at least one element comprises at least one icon such that presence of the icon indicates that increased attention is due the project attribute associated with the element, the icon being defined by graphical components different than graphical components that define the associated graphical element.

2. The graphical user interface of claim 1, wherein the workspace comprises one or more concentric circles arrayed around the central point such that project attributes represented in a same concentric circle have a same relative hierarchy within the project.

3. The graphical user interface of claim 2, wherein the concentric circles are divided into one or more wedge-shaped segments such that a relative size of each of the segments is indicative of an attribute of a project or task.

4. The graphical user interface of claim 3, wherein the segments are colored to indicate an attribute of a project or task.

5. The graphical user interface of claim 1, further comprising an outer ring containing the name of a project or task.

6. The graphical user interface of claim 1, further comprising a ring having a graphical progress bar that graphically represents the progress toward completion of a project or task.

7. The graphical user interface of claim 1, further comprising a navigation area having a hierarchal list of iconic folders.

8. The graphical user interface of claim 1, further comprising an editing area having one or more editing panels for entering and editing projects and tasks.

9. The graphical user interface of claim 1, wherein an attribute of the one or more icons is indicative of the status of a project or task.

10. The graphical user interface of claim 9, wherein the attribute of the one or more icons is icon size.

11. The graphical user interface of claim 9, wherein the attribute of the one or more icons is animation.

12. The graphical user interface of claim 9, wherein the attribute of the one or more icons is color.

13. The graphical user interface of claim 9, wherein the attribute of the one or more icons is sound.

14. The graphical user interface of claim 9, wherein the one or more icons are associated with an audible alarm that sounds when a threshold attentiveness level is reached.

15. A system for managing one or more projects comprising:
   (a) a server having an associated memory for storing project data;
   (b) a remote client capable of communicating with the server over a network; and
   (c) a memory associated with the remote client containing stored program instructions that cause remote client to display a graphical interface, the graphical interface comprising:
      (i) a graphical display workspace having a generally central point;
      (ii) one or more graphical elements contained within the workspace and arrayed around the central point, wherein each graphical element represents a project attribute, and a position of the one or more elements within the workspace relative to the central point is indicative of a relative hierarchy of the project attribute within a series of project attributes in the project; and
      (iii) each of the graphical elements describes an angular section around the central point such that the relative angular section of the graphical element is indicative of an attribute of the project element associated with the graphical element,
      wherein at least one element comprises at least one icon such that presence of the icon indicates that increased attention is due the project attribute associated with the element, the icon being defined by graphical components different than graphical components that define the associated graphical element.

16. The graphical user interface of claim 15, wherein the workspace comprises one or more concentric circles arrayed around the central point such that project attributes represented in a same concentric circle have a same relative hierarchy within the project.

17. The graphical user interface of claim 16, wherein the concentric circles are divided into one or more wedge-shaped segments such that a relative size of each of the segments is indicative of an attribute of a project or task.

18. The graphical user interface of claim 17, wherein the segments are colored to indicate an attribute of a project or task.

19. The graphical user interface of claim 15, further comprising an outer ring containing the name of a project or task.

20. The graphical user interface of claim 15, further comprising a ring having a graphical progress bar that graphically represents the progress toward completion of a project or task.

21. The graphical user interface of claim 15, further comprising a navigation area having a hierarchal list of iconic folders.

22. The graphical user interface of claim 15, further comprising an editing area having one or more editing panels for entering and editing projects and tasks.

23. The graphical user interface of claim 15, wherein an attribute of the one or more icons is indicative of the status of a project or task.

24. The graphical user interface of claim 15, wherein the attribute of the one or more icons is icon size.

25. The graphical user interface of claim 15, wherein the attribute of the one or more icons is animation.

26. The graphical user interface of claim 15, wherein the attribute of the one or more icons is color.

27. The graphical user interface of claim 15, wherein the attribute of the one or more icons is sound.

28. The system of claim 15, further comprising one or more users from one or more remote clients accessing the one or more projects to add, edit, or change one or more attributes of the projects or tasks.

29. The system of claim 28, wherein the one or more users grants access privileges to one or more other users.

30. A system for displaying project status information, comprising:

memory for storing project status information; and a processor coupled to the memory and at least one of a public or private data network, the processor comprising:

a first component configured to receive project status information and store the project status information in the memory, the project status information includes information regarding tasks related to a project, the task information includes an importance value and a progress value;

a second component configured to display a graphical user interface, the graphical user interface comprises:

a radar screen configured to display one or more wedges, wherein each wedge is associated with a task and wherein the size of the wedge is based on the importance value; and a detail panel editing area configured to allow a user to enter and edit the importance value, the progress value of a task and general task information; and a third component configured to automatically change the size of a wedge if the importance value of the associated task has been changed;

a fourth component configured to allow a user to change the general task information;

a fifth component configured to display one or more alert icons, if the general task information meets a predefined alert criteria, wherein the alert icons are displayed in the wedge of an associated task;

a sixth component configured to automatically change the position of the alert icon in a wedge, if the general task information has changed relative to the predefined alert criteria.

* * * * *